United States Patent
Swarup et al.

(10) Patent No.: US 9,938,425 B2
(45) Date of Patent: Apr. 10, 2018

(54) METHODS AND COMPOSITIONS FOR COATING SUBSTRATES

(71) Applicant: PPG Industries Ohio, Inc., Cleveland, OH (US)

(72) Inventors: Shanti Swarup, Allison Park, PA (US); Richard J. Sadvary, Tarentum, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 348 days.

(21) Appl. No.: 14/479,499

(22) Filed: Sep. 8, 2014

(65) Prior Publication Data
US 2014/0377468 A1    Dec. 25, 2014

Related U.S. Application Data

(63) Continuation-in-part of application No. 13/780,540, filed on Feb. 28, 2013, now Pat. No. 8,846,156.

(51) Int. Cl.
C09D 133/14    (2006.01)
B05D 7/00      (2006.01)
(Continued)

(52) U.S. Cl.
CPC ........... C09D 133/14 (2013.01); B05D 7/577 (2013.01); C08F 290/067 (2013.01);
(Continued)

(58) Field of Classification Search
CPC .... C09D 133/14; C09D 5/022; C09D 175/04; C08F 290/067; C08G 18/0823;
(Continued)

(56) References Cited

U.S. PATENT DOCUMENTS 5,066,705 A * 11/1991 Wickert ............... C08G 18/833
                                                428/411.1
6,080,296 A *  6/2000 Lieverz ................. B05D 7/577
                                                204/486
(Continued)

FOREIGN PATENT DOCUMENTS

DE      19623372 A1    12/1997
JP      2006346599     12/2006
(Continued)

OTHER PUBLICATIONS

Nakayama, Yasuharu. "Development of novel aqueous coatings which meet the requirements of ecology-conscious society: novel cross-linking system based on the carbonyl-hydrazide reaction and its applications." Progress in organic coatings 51.4 (2004): 280-299.*

(Continued)

*Primary Examiner* — Nicholas E Hill
(74) *Attorney, Agent, or Firm* — Krisanne Shideler

(57) ABSTRACT

A method for applying a multilayer coating comprising a basecoat and a clearcoat is disclosed. The basecoat is a curable aqueous composition comprising (1) polymeric particles prepared from ethylenically unsaturated compounds including a multi-ethylenically unsaturated monomer and a keto or aldo-functional monomer, and (2) a polyhydrazide. A hydrophobic polymer is present in the aqueous composition to improve its humidity resistance.

19 Claims, 1 Drawing Sheet

(51) Int. Cl.
*C09D 5/02* (2006.01)
*C08G 18/48* (2006.01)
*C08G 18/75* (2006.01)
*C08G 18/79* (2006.01)
*C08F 290/06* (2006.01)
*C08G 18/08* (2006.01)
*C08G 18/34* (2006.01)

(52) U.S. Cl.
CPC ....... *C08G 18/0823* (2013.01); *C08G 18/348* (2013.01); *C08G 18/4854* (2013.01); *C08G 18/755* (2013.01); *C08G 18/797* (2013.01); *C09D 5/022* (2013.01); *B05D 2202/10* (2013.01)

(58) Field of Classification Search
CPC ............. C08G 18/348; C08G 18/4854; C08G 18/755; C08G 18/797
See application file for complete search history.

(56) References Cited

U.S. PATENT DOCUMENTS

| | | | |
|---|---|---|---|
| 8,846,156 B2* | 9/2014 | Swarup | B05D 3/02 427/407.1 |
| 2004/0134791 A1 | 7/2004 | Toi et al. | |
| 2005/0228124 A1* | 10/2005 | Swarup | B05D 5/005 524/800 |
| 2006/0063868 A1 | 3/2006 | Janmaat et al. | |
| 2009/0137734 A1 | 5/2009 | Pajerski | |
| 2011/0104608 A1 | 5/2011 | Nakajima et al. | |
| 2011/0111242 A1 | 5/2011 | Tomizaki et al. | |
| 2012/0314225 A1* | 12/2012 | Adachi | B23K 3/08 356/601 |
| 2013/0281636 A1* | 10/2013 | Hartig | C08F 283/006 525/440.08 |
| 2014/0242280 A1* | 8/2014 | Swarup | B05D 3/02 427/385.5 |

FOREIGN PATENT DOCUMENTS

| | | | |
|---|---|---|---|
| JP | 2007039615 | 2/2007 | |
| JP | 2011148916 A * | 8/2011 | |
| WO | WO 97/47402 A1 | 12/1997 | |
| WO | WO 2012/084668 A1 | 6/2012 | |
| WO | WO 2014/134039 A2 | 9/2014 | |
| WO | WO 2014134039 A2 * | 9/2014 | ............... B05D 3/02 |

OTHER PUBLICATIONS

Machine translation of JP2011-148916A, performed on JPO website on Jan. 4, 2017, 66 pages.*

* cited by examiner

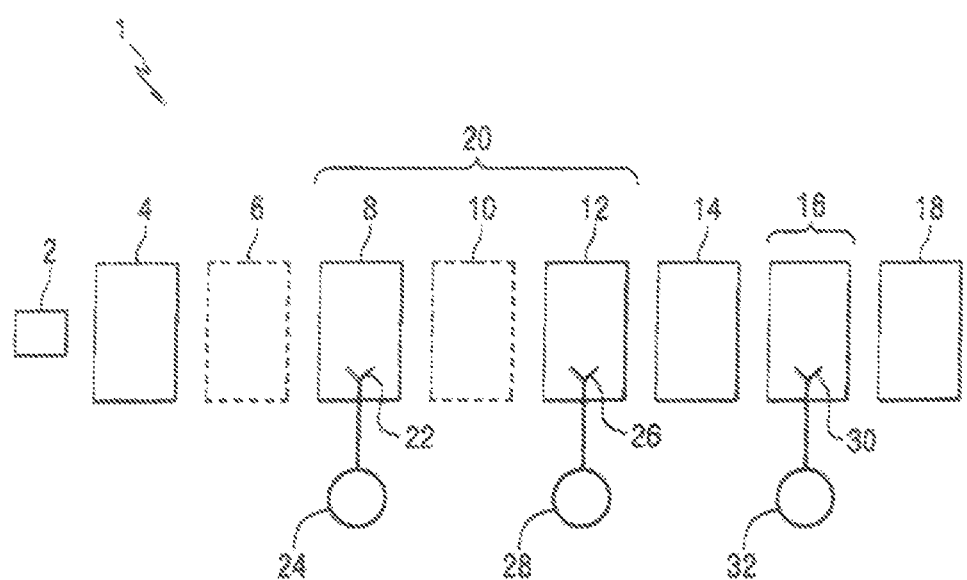

METHODS AND COMPOSITIONS FOR COATING SUBSTRATES

CROSS-REFERENCE TO RELATED APPLICATIONS

This application is a Continuation-in-Part of U.S. application Ser. No. 13/780,540, filed 28 Feb. 2013, entitled "Methods and Compositions for Coating Substrates", which is hereby incorporated by reference.

FIELD OF THE INVENTION

The present invention relates to methods for coating substrates and to the coating compositions used in the methods. More particularly, the invention relates to coating automotive substrates with an aqueous basecoat, clearcoat composite coating in which the basecoat cures through dehydration of the basecoat.

BACKGROUND OF THE INVENTION

Commercial automotive coatings, that is, coatings for passenger cars and trucks, require many application and processing steps. Typically, a primer coat to provide corrosion resistance is applied by electrodeposition to the automotive body and then cured by heating in an oven. The automotive body may then be passed to a coating station where a primer surfacer is applied to provide a thick heavy pigmented coating that provides protection against road stone damage and also shields the electrodeposited primer layer from ultraviolet light that can deteriorate the primer layer. The primer surfacer layer is separately heat cured. Next a color-imparting basecoat is applied to the cured primer surfacer layer. Alternatively, in so-called "compact processes", the primer surfacer layer and the separate curing step is eliminated and replaced with a coating that co-cures with the basecoat layer. The basecoat layer is typically derived from a water-based composition comprising a polymer, typically a (meth)acrylic polyol and a melamine curing agent. The basecoat layer is typically dehydrated at about 80-85° C. but not cured. An unpigmented transparent coat, called a clearcoat, is applied to the dehydrated basecoat (color plus clear coating). The clearcoat is a curable composition and the composite color plus clear coating cured in one step at about 140-150° C. This is the case even if the clearcoat is curable at lower temperatures such as with clearcoats that are based on hydroxyl-isocyanate curing because the basecoat composition with the melamine curing agent requires higher temperatures for curing.

However, a problem exists in that the basecoat layer is only dehydrated but not cured before application of the clearcoat. The uncured or partially cured basecoat does not have sufficient "hold out" properties, that is, solvents from the clearcoat can migrate into the basecoat adversely affecting pigment orientation in the basecoat. Also, lack of cure can adversely affect intercoat adhesion. The basecoat could be cured before application of the clearcoat but this would add another energy-consuming step in the coating process.

To overcome this problem, it has been suggested in U.S. application Ser. No. 13/780,540, filed 28 Feb. 2013 (PCT Application Serial No. US14/018319, filed 25 Feb. 2014) to formulate the aqueous basecoat composition that cures through dehydration specifically using keto/aldo hydrazide curing mechanism resulting in a high degree of cure before the clearcoat is applied. Since the basecoat has a high degree of cure, this allows the clearcoat to be cured at a lower temperature.

The present invention provides an improvement to the above-mentioned basecoat composition by adding to the formulation a polymer that improves the chip and humidity resistance, as determined by the degree of blistering of the color plus clear coating, of the basecoat and of the composite base-clear coating.

SUMMARY OF THE INVENTION

The present invention provides a method of applying a multilayer coating to a substrate comprising:
(a) applying a color-imparting, pigment-containing basecoat composition directly to a substrate to form a curable color-imparting basecoat layer, and
(b) applying a curable unpigmented coating composition to the basecoat layer to form a transparent coating layer over the basecoat layer, wherein the basecoat layer is formed by depositing a polyhydrazide-containing curable aqueous composition comprising:
(i) a continuous phase comprising water, and
(ii) a dispersed phase comprising:
(A) polymeric particles prepared from the polymerization of a mixture of ethylenically unsaturated monomer compounds, including ethylenically unsaturated monomers comprising:
(1) a multi-ethylenically unsaturated monomer and
(2) a keto or an aldo group-containing ethylenically unsaturated monomer; and
(B) a polymer prepared from polymerizing the following mixture of ethylenically unsaturated monomers:
(I) a $C_8$ to $C_{20}$ alkyl ester of (meth)acrylic acid;
(II) a polymerizable ethylenically unsaturated monomer comprising a polar functional group; and
(III) optionally, a polymerizable ethylenically unsaturated monomer, wherein (I), (II) and (III) are different from each other; and
wherein the polymer has a glass transition temperature of −10° C. or less.

The invention also provides an aqueous thermosetting coating composition comprising:
(i) a continuous phase comprising water, and
(ii) a dispersed phase comprising:
(A) polymeric particles prepared from the polymerization of a mixture of ethylenically unsaturated compounds including ethylenically unsaturated monomers comprising from:
(1) 2 to 30 percent by weight of a multi-ethylenically unsaturated monomer and
(2) at least 30 percent by weight of an aldo or keto group-containing ethylenically unsaturated monomer,
the percentages by weight being based on total weight of the ethylenically unsaturated monomers;
(B) a polymer prepared from polymerizing the following mixture of ethylenically unsaturated monomers:
(I) a $C_8$ to $C_{20}$ alkyl ester of (meth)acrylic acid;
(II) a polymerizable ethylenically unsaturated monomer comprising a polar functional group; and (III) optionally, a polymerizable ethylenically unsaturated monomer, wherein (I), (II) and (III) are different from each other and
wherein the polymer has a glass transition temperature of −10° C. or less;
(C) a polyhydrazide; and
(D) one or more pigments.

BRIEF DESCRIPTION OF THE DRAWING

FIG. I is a schematic block diagram of a coating line in an automotive assembly plant illustrating features of the method of the invention.

DETAILED DESCRIPTION

As used herein, any numerical range recited is intended to include all sub-ranges subsumed therein. For example, a range of "1 to 10" is intended to include all sub-ranges between value of 1 and the recited maximum value of 10, that is, having a minimum value equal to or greater than 1 and a maximum value of equal to or less than 10.

Also, as used herein, the term "polymer" is meant to refer to oligomers and both homopolymers and copolymers. Unless stated otherwise, as used in the specification and the claims, molecular weights are either number average molecular weights as indicated by "Mn" or weight average molecular weights as indicated by "Mw", both of which obtained by gel permeation chromatography using polystyrene standards in an art-recognized manner. The term (meth) acrylates refers to both acrylates and methacrylates.

FIG. I schematically depicts a coating line 1 used in an automotive assembly plant. Useful substrates 2 that can be coated according to the method of the present invention include metallic substrates that can be used to fabricate automotive vehicles, such as automobiles, trucks and tractors. The substrates can have any shape, but in one embodiment are in the form of automotive body components such as bodies (frames), hoods, doors, fenders, bumpers and/or trim for automotive vehicles.

With reference to FIG. I, a metal substrate 2 is passed to an electrodeposition station 4 where a coating compositions is electrodeposited over the metal substrate 2. Suitable electrodeposition coatings are ED 6280 and ED 7000 commercially available from PPG Industries. Useful electrodeposition methods and electrodeposition coating compositions include conventional anionic or cationic electrodepositable coating compositions, such as epoxy or polyurethane-based coatings. Suitable electrodepositable coatings are disclosed in U.S. Pat. Nos. 4,933,056; 5,530, 043; 5,760,107 and 5,820,987. The electrodeposition coating layer is cured in an oven 6. before further processing. Curing conditions are typically from 175 to 205° C. for 20 to 60 minutes.

A primer layer may then be applied to the electrodeposited coating layer in a primer zone 20 comprising one or more coating stations. The primer zone 20 is located downstream of and adjacent to the electrodeposition oven 6. The primer station 8 has one or more conventional applicators 22, e.g., bell or gun applicators, connected to or in flow communication with a source 24 of a primer composition. The primer composition can be applied, e.g., sprayed, over the substrate 2 by one or more applicators 22 at the primer station 8 in one or more spray passes to form a primer layer over the substrate 12. The primer layer can be a conventional primer surfacer layer or, in the case of a coating line using a compact process, can be an aqueous primer comprising a resinous binder that cures during dehydration of the primer layer and a color-imparting pigment composition comprising one or more coloring pigments.

A curing device (in the case of a primer surfacer) or a drying device (in the case of an aqueous primer), such as an oven 10 or flash chamber, can be located downstream of and/or adjacent to the primer station 8 to optionally cure or dehydrate and cure the primer layer. Typically, curing of the primer surfacer will be at a temperature of 50 to 100° C. and dehydration of the aqueous primer layer will be at a temperature of ambient to 90° C., usually 50-80° C.

A basecoat station 12 can be located downstream of and/or adjacent to the primer station 8 and can have one or more conventional applicators 26, e.g., bell or gun applicators, connected to and in flow communication with a source 28 of a basecoat composition described in more detail below. The basecoat composition can be applied, e.g., sprayed, over the primer layer by one or more applicators 26 in one or more spray passes to form a basecoat layer over the primer layer. As described in more detail below, the basecoat composition is an aqueous composition comprising a resinous binder that cures during dehydration of the basecoat layer. The basecoat composition also includes one or more color-imparting pigments.

A conventional drying device 14 is located downstream of and/or adjacent to the basecoat station 12 where the basecoat can be dried and cured. Typically, dehydration of the basecoat layer will be at a temperature of ambient to 90° C., usually 50-80° C. Alternatively, when the basecoat layer is applied wet-on-wet to the aqueous primer layer, both layers can be simultaneously dehydrated and cured at a temperature of ambient to 90° C., usually 50-80° C.

After the basecoat layer has been dehydrated and cured, one or more conventional clearcoat layers can be applied over the basecoat layer at a clearcoat station 16. The clearcoat station includes one or more conventional applicators 30 (e.g., bell applicators) connected to and in flow communication with a source 32 of clearcoat composition. The clearcoat composition is unpigmented and contains resinous ingredients that are dissolved in a diluent that may be an organic solvent or may be a mixture of organic solvents and water. In the embodiment shown in FIG. I, an oven 18 is located downstream of and/or adjacent to the clearcoat station 16 to cure the clear or transparent layer. Depending on the resinous ingredients in the clearcoat composition, curing typically occurs at a temperature of 80-150° C. for a period of 20 to 40 minutes. The clearcoat compositions are known in the art for automotive applications. Such compositions are described in U.S. Pat. Nos. 4,650,718; 5,814,410; 5,891,981 and WO 98/14379. Automotive clearcoat compositions are commercially available from PPG Industries under the trademarks NCT. DIAMOND COAT and CERAMICLEAR.

As used herein, "cure" means that resinous components of the coating layers are substantially crosslinked as evidenced by the attainment of physical and chemical properties necessary for automotive quality coatings. Cure or the degree of cure can be determined by dynamic mechanical thermal analysis (DMTA) using a Polymer Laboratories MK III DMTA analyzer conducted under nitrogen. Accordingly, cure means a degree of cure be at least 50, such as at least 85, and at least 90 percent of complete crosslinking as determined by the analysis mentioned above.

The curable aqueous basecoat compositions that are useful in the method of the invention comprise a dispersion of polymeric particles in a continuous aqueous phase. The polymeric particles are prepared from the polymerization of a mixture of ethylenically unsaturated compounds including ethylenically unsaturated monomers that comprise at least one multi-ethylenically unsaturated monomer and at least one keto or aldo group containing ethylenically unsaturated monomer.

The dispersion of polymeric particle can be made by conventional oil in water emulsion polymerization techniques typically to a solids content of 20 to 50 percent by weight. The polymerization can be conducted using conventional additives such as emulsifiers, protective colloids, free radical initiators and chain transfer agents. Generally, the polyhydrazide is added after the polymerization. The polymeric particles typically have a mean particle size (diameter) of from 40 to 250 nanometers.

The multi-ethylenically unsaturated monomers are typically diethylenically or triethylenically unsaturated monomers. Suitable monomers include divinyl aromatics such as divinyl benzene, diacrylates and dimethacrylates of $C_{2-24}$ diols such as butane diol and hexane diol, divinyl ethylene urea and other divinyl ureas, and diallyl and triallyl compounds such as diallyl phthalate and triallyl isocyanurate. The amount of multi-ethylenically unsaturated monomers is 2 to 30 percent by weight based on total weight of ethylenically unsaturated monomers. The inclusion of such monomers causes crosslinking between the polymer backbones, which is important because such crosslinking allows the basecoat to hold out the subsequently applied clearcoat from streaking into the basecoat adversely affecting appearance and physical properties. Amounts less than 2 percent by weight provide insufficient crosslinking, whereas amounts greater than 30 percent are also undesirable because the dispersion becomes very viscous and difficult to process.

The aldo or keto group containing ethylenically unsaturated monomer is reactive with the polyhydrazide upon dehydration of the basecoat resulting in a cured or crosslinked coating. Examples of such monomers include (meth) acrolein, diacetone (meth)acrylamide, acetoacetoxyethyl (meth)acrylate and vinyl acetoacetate. The aldo or keto group containing ethylenically unsaturated monomer is typically present in an amount of at least 30 percent by weight based on total weight of ethylenically unsaturated monomers. Amounts less than 30 percent are undesirable because of poor physical properties such as solvent resistance and humidity resistance. Typically, amounts greater than 60 percent by weight are not used because of the need to incorporate other ethylenically unsaturated monomers as described below to obtain the physical and chemical properties required for automotive quality coatings.

Besides the ethylenically unsaturated monomers mentioned above, alkyl esters of (meth)acrylic acid are usually used in the preparation of the polymeric particles. Typically, these monomers contain from at least 4, such as 4 to 10 carbon atoms, and at least 6, such as 6 to 10 carbon atoms in the alkyl group. These monomers are typically present in amounts of 4 to 40 percent by weight based on total weight of ethylenically unsaturated monomers. These monomers provide for low glass transition temperatures ($T_g$) in the cured basecoat layers, which is desirable because of road stone and chip resistance. $T_g$s less than 25° C. are desirable.

The $T_g$ can be measured on a cured film of the polymeric particles by Differential Scanning Colorimetry (rate of heating of 10° C./minute with the $T_g$ taken at the first inflection point). Examples of suitable monomers include isooctyl acrylate, 4-methyl-2-pentyl acrylate, 2-methyl-butyl acrylate, isoamyl acrylate, sec-butyl acrylate, n-butyl acrylate, 2-ethylhexyl acrylate, isodecyl methacrylate, isononyl acrylate, isodecyl acrylate, and the like, including mixtures thereof.

Other ethylenically unsaturated monomers may also be used such as hydroxyalkyl esters of (meth)acrylic acid such as hydroxyethyl and hydroxypropyl (meth)acrylate; alkyl esters of (meth)acrylic acid having 1 to 2 carbon atoms in the alkyl group such as methyl (meth)acrylate; acid group containing monomers such as (meth)acrylic acid; and vinyl aromatic monomers such as styrene and vinyl toluene. Amounts of 0 to 60 percent are typical.

Besides the ethylenically unsaturated monomers, other ethylenically unsaturated compounds may be used. An example of such a compound is an ethylenically unsaturated polyurethane. These materials can be prepared by reaction of a polyisocyanate, usually a diisocyanate with a polyol, a polyol such as a diol containing carboxylic acid groups, optionally another polyol having a number average molecular weight of 60 to 10,000 and a hydroxyl group-containing ethylenically unsaturated monomer.

Among the polyisocyanates that may be used are aliphatic including cycloaliphatic diisocyanates such as tetramethylene diisocyanate, 2,2,4-trimethylhexane diisocyanate, hexamethylene diisocyanate, lysine diisocyanate, as well as alicyclic diisocyanates such as 1,4-cyclohexylene diisocyanate, 4,4'-dicyclohexylmethane diisocyanate, isophorone diisocyanate and the like.

As polyols, there may be used low molecular weight glycols, high molecular weight glycols, such as polyether polyols, and the like individually, or mixtures of high molecular weight glycols and low molecular weight glycols.

Examples of low molecular weight glycols are ethylene glycol, diethylene glycol, triethylene glycol, 1,2-propylene glycol, 1,3-butylene glycol, tetramethylene glycol, hexamethylene glycol, and the like, which may be used individually or in admixture.

Examples of high molecular weight polyglycols, are polyether glycols such as polyethylene glycol, polypropylene glycol, polytetramethylene glycol, and the like, and polyester glycols.

Examples of carboxylic acid group-containing polyols, are 2,2-dimethylol propionic acid, 2,2-dimethylol butyric acid, 2,2-dimethylol valeric acid, and the like. Typically, the carboxylic acid group-containing polyols are present in amounts of 5 to 30 percent by weight based on weight of resin solids of the ethylenically unsaturated polyurethane. The acid value of the ethylenically unsaturated polyurethane is typically about 20 to 60 based on resin solids of the ethylenically unsaturated polyurethane.

Examples of hydroxyl group-containing ethylenically unsaturated monomers are (meth)acrylates such as 2-hydroxyethyl (meth)acrylate, hydroxypropyl (meth)acrylate, hydroxybutyl (meth)acrylate, and the like.

Also, allyl compounds such as allyl alcohol may be used.

The synthesis reaction of the ethylenically unsaturated polyurethane resin may be carried out with one or more of the acrylic monomers such as 2-ethylhexyl (meth)acrylate acting as a reactive solvent. Also, an unreactive organic solvent that is inactive to the isocyanate group and which has high compatibility with water, such as dioxane, acetone, methyl ethyl ketone, methyl isobutyl ketone, N-methylpyrrolidone, tetrahydrofuran and the like may be used.

The proportions of the hydroxyl group-containing reactants may be changed variously but the equivalent ratio between isocyanate groups and hydroxyl groups in all components is from 1:1 to 1:1.5 such as 1:1 to 1:1.3. The amount of the hydroxyl group-containing ethylenically unsaturated monomer may be 0.01-1, usually 0.02-0.8 equivalent to 1 equivalent of isocyanate group.

Preparation of the ethylenically unsaturated polyurethane resin is not limited to any one method, and diisocyanate, a polyol, a carboxyl group-containing diol and a hydroxyl group-containing ethylenically unsaturated monomer may be reacted simultaneously, or the resin may be prepared by multi-step reaction method. In the latter case, a diisocyanate is reacted with a part of the polyol and a carboxyl group-containing diol to synthesize a prepolymer having the isocyanate end, and thereafter the remainder of the polyol and a hydroxyl group-containing ethylenically unsaturated monomer are reacted with the prepolymer. Generally, the reaction may be carried out at the temperature of 40-180° C., usually 60-130° C.

In order to accelerate the reaction, there may be used catalysts generally used in the conventional urethane reactions, such as triethylamine, N-ethyl morpholine, triethyldiamine and the like, as well as tin type catalysts such as dibutyl tin dilaurate, dioctyl tin dilaurate and the like. Furthermore, in order to prevent polymerization of an ethylenically unsaturated compound during the urethane reaction, there may be used hydroquinone, hydroquinone monomethyl ether, p-benzoquinone and the like.

For enhanced dispersion stability, the polymeric particles can contain an amine salt group. Typically, this can be incorporated into the particle by forming the amine salt of the acid associated with the ethylenically unsaturated polyurethane. The acid groups can be at least partially neutralized, i.e., at least 30 percent of the total neutralization equivalent, by an inorganic base such as sodium hydroxide or an amine, particularly a volatile amine. Examples of suitable amines are ammonia, dimethylamine, trimethylamine, monoethanolamine, and dimethylethanolamine. By carboxylic acid functionality is meant carboxylic acid as well as salts thereof.

The ethylenically unsaturated polyurethanes typically comprise from 30 to 60 percent by weight of the ethylenically unsaturated compounds used in the preparation of the polymeric particles and ethylenically unsaturated monomers comprise from 40 to 70 percent by weight of the ethylenically unsaturated compounds; the percentages by weight being based on total weight of the ethylenically unsaturated compounds.

A polyhydrazide that is a material containing two or more hydrazide groups is also present in the curable aqueous basecoat composition. The hydrazide group is very polar and usually the polyhydrazide will be in the aqueous phase. However, hydrophobic polyhydrazides may be in the dispersed phase. The polyhydrazides are reactive with the keto or aldo functionality present in the polymeric particles during dehydration of the basecoat layer to form a crosslinked coating. The polyhydrazide compounds suitable for this invention have two or more hydrazino groups (—NH—NH$_2$) per molecule which bind directly to the carbon atoms of the aldo or keto group. Examples of these are maleic dihydrazide, fumaric dihydrazide, itaconic dihydrazide, phthalic dihydrazide, isophthalic dihydrazide, terephthalic dihydrazide, trimellitic trihydrazide, oxalic dihydrazide, adipic dihydrazide and sebacic dihydrazide, and others. The polyhydrazide compound typically has between 1 to 10 carbon atoms with an equivalent ratio of hydrazide to aldo or ketone being from 0.5 to 1.5:1, permitting the coating composition to crosslink to form the highly crosslinked cured film. The polyhydrazide compound is usually present in an amount between about 0.1 weight percent to about 3.0 weight percent, based on the total weight of the curable aqueous composition.

Besides the polyhydrazide, the curable aqueous composition can contain a polycarbodiimide that is reactive with carboxylic acid functionality that is present in the polymer particle due to the carboxylic acid functionality present in the ethylenically unsaturated monomers, e.g., (meth)acrylic acid or carboxylic acid functionality present in the ethylenically unsaturated polyurethane, e.g., from the polyol containing carboxylic acid groups. As mentioned earlier, the carboxylic acid functionality is typically at least partially neutralized with a volatile amine that volatilizes during the formation of the basecoat layer exposing carboxylic acid groups that are reactive with the polycarbodiimides at ambient temperature. The equivalent ratio of polycarbodiimide to carboxylic acid is typically 0.5 to 1.5:1 and the polycarbodiimide when used is typically present in the coating composition in amounts of 1.5 to 25 percent by weight based on total weight of the curable aqueous composition. Examples of suitable polycarbodiimides are disclosed in US 2011/0070374 and are available from Nisshinbo Industries, Inc. under the trademark CARBODILITE.

To improve the chip and humidity resistance of the basecoat layer and of the composite coating, an adjuvant hydrophobic polymer can be included in the basecoat formulation. The polymer comprises the free radical initiation polymerization of the following mixture of ethylenically unsaturated monomers:

(I) a $C_8$ to $C_{20}$ alkyl ester of (meth)acrylic acid;
(II) a polymerizable ethylenically unsaturated monomer comprising a polar functional group; and
(III) optionally, a different polymerizable ethylenically unsaturated monomer, wherein (I), (II) and (III) are different from each other; and wherein the polymer has a glass transition temperature of −10° C. or less, such as −30° C. or less.

By hydrophobic is meant the polymer is not soluble in water even if the polymer contains acid groups that are neutralized with base; although the neutralized polymer may be dispersible in water. In a mixed 50/50 percent by volume water immiscible organic solvent/water mixture, the hydrophobic polymer will be partitioned mainly, that is, at least 90, such as 95 percent by weight in the organic phase.

For the hydrophobic polymer, the term "glass transition temperature" is a theoretical value being the glass transition temperature as calculated by the method of Fox on the basis of monomer composition according to T. G. Fox, Bull. Am. Phys. Soc. (Ser. II) 1, 123 (1956) and J. Brandrup, E. H. Immergut, Polymer Handbook 3$^{rd}$ edition, John Wiley, New York, 1989.

The $C_8$ to $C_{20}$ alkyl ester of (meth)acrylic acid (I) of the polymer can comprise, for example, octyl (meth)acylate, lauryl (meth)acrylate, cetyl(meth)acrylate, stearyl (meth)acrylate, behenyl (meth)acrylate, and/or eicosyl (meth)acrylate. In a particular embodiment, the $C_8$ to $C_{20}$ alkyl ester of (meth)acrylic acid comprises lauryl (meth)acrylate.

The $C_8$ to $C_{20}$ alkyl ester of (meth)acrylic acid is typically present at an amount of 50 to 95, such as 70 to 90 weight percent based on total weight of ethylenically unsaturated monomers.

In addition to the $C_8$ to $C_{20}$ alkyl ester of (meth)acrylic acid as described above, the monomer mixture comprises a polymerizable ethylenically unsaturated monomer comprising a polar functional group. As used herein, the term "polar functional group" refers to a functional group having a high dielectric constant and strong polarity. Any suitable polymerizable ethylenically unsaturated monomer having a polar functional group can be used.

The polar functional group can comprise, for example, carboxyl groups, hydroxyl groups, and/or amine groups. In an embodiment of the present invention, the polar functional group comprises a carboxyl group. In a particular embodiment, the ethylenically unsaturated monomer (II) comprises (meth)acrylic acid.

In certain embodiments, the ethylenically unsaturated monomer (II) is present at an amount of at least 0.1 to 5, such as 1 to 4 weight percent based on total weight of ethylenically unsaturated monomers.

The monomer mixture optionally comprises a different polymerizable ethylenically unsaturated monomer (III), wherein (I), (II) and (III) are different from each other. Any suitable polymerizable ethylenically unsaturated monomer may be used, provided that the polymer has a glass transition temperature of −10° C. or less. Further, if present, these polymerizable ethylenically unsaturated monomers may be present in any suitable amount provided that the glass transition temperature of the polymer does not exceed −10° C. Examples of monomer (III) are alkyl esters of (meth) acrylic acid containing from 2 to 4 carbon atoms in the alkyl group.

In certain embodiments, the polymer is present in the coating composition at an amount of 2 to 30, such as 5 to 15 weight percent based on the total weight of resin solids of the coating composition.

Besides the above components, the curable aqueous composition also contains one or more color-imparting pigments such as organic and inorganic pigments, including color effect pigments such as aluminum flake and metal oxide coated micas. The pigments are typically present in the curable aqueous compositions such that the pigment to resin ratio is from 0.02 to 1.5:1 and usually the pigment is present in the composition in amounts of 2 to 70 percent by weight based on total weight of the composition.

Other optional ingredients such as dyes, wetting agents, defoamers, leveling agents, fillers, plasticizers, fungicides and solvents may also be present in the curable aqueous composition. These optional ingredients may be present in amounts up to 20 percent by weight based on total weight of the curable aqueous composition.

The aqueous curable composition can be formulated by blending the dispersion of the polymeric particles, the polymer and the polyhydrazide with low shear mixing. The composition can be applied to the substrate by conventional techniques such as spraying, brushing and roll coating. The coated substrate is then dried at ambient temperature, that is, 20-25° C., or may be heated to 90° C. to cure the composition. The curing time will vary depending on the temperature and relative humidity. Typically, curing times are from 5 to 120 minutes.

EXAMPLES

Illustrating the invention are the following Examples that are not to be considered as limiting the invention to their details. All parts and percentages in the Examples as well as throughout the specification are by weight unless otherwise indicated.

Example A (Ethylenically Unsaturated Polyurethane)

A mixture containing a polyurethane acrylate prepolymer was prepared by adding 270 g of butyl acrylate (BA), 213.8 g of hydroxyethyl methacrylate, 242.6 g of dimethylol propionic acid, 4.1 g of 2,6-di-tert-butyl 4-methyl phenol, 2.1 g of triphenyl phosphite, 10.8 g of triethyl amine and 2.1 g of dibutyl tin dilaurate to a four-necked round bottom flask fitted with a thermocouple, mechanical stirrer, and condenser and heated to 90° C. to obtain a homogeneous solution. Then 1093.5 g of polytetrahydrofuran molecular weight 1000 was added. To this mixture at 90° C., isophorone diisocyanate 636.1 g was added over 90 minutes. The isocyanate container was rinsed with 54.0 g of BA. The reaction mixture was stirred at 90° C. until all the isocyanate groups were reacted. Then 1215 g of EHA was added and cooled to ambient temperature.

Example B

A polyurethane acrylic latex containing 9 percent by weight diacetone acrylamide (DAAM) and 6 percent by weight of 1,6-hexanediol diacrylate, the percentages by weight being based on total weight of ethylenically unsaturated monomers, was prepared as follows:

Sixty-seven (67) g of Aerosol OT-75 (surfactant from Cytec Industries), 25.3 g of Adeka Reasoap SR-10 (emulsifier from Adeka Corp.), 73.8 g of dimethyl ethanol amine, 1715.7 g of prepared polyurethane/EHA mixture of Example A, 84.3 g of 1,6-hexanediol diacrylate, 606.7 g of methyl methacrylate, 205.6 g of butyl methacrylate, 252.7 g of diacetone acrylamide and 4512.0 g of deionized water were charged to a four-necked round bottom flask fitted with a thermocouple, mechanical stirrer, and condenser and heated to 33° C. to obtain a homogeneous solution. 4.1 g of t-butylhydroperoxide and 126.4 g of deionized water was then charged into the flask and mixed for 10 minutes. After that, 0.063 g of ferrous ammonium sulfate, 3.2 g of sodium metabisulfite and 126.4 g of deionized water were charged over 30 minutes. During this charge, exotherm was expected. After peak exotherm, the system was held at 65° C. for 1 hour. After it cooled to 45° C., 29.5 g of acticide MBS (biocide from Thor GmbH), 1.52 g of FOAMKILL 649 (defoamer from Crucible Chemical Co.) and 12.6 g of deionized water were charged into the flask and mixed for 15 minutes.

Example C

An adjuvant polymer was prepared as follows:

| Ingredients | Parts By Weight (grams) |
|---|---|
| Charge 1 | |
| Methyl Isobutyl Ketone | 340.0 |
| Feed 1 | |
| Lauryl Methacrylate (LMA) | 2082.0 |
| Methacrylic Acid | 42.1 |
| Feed 2 | |
| t-Amyl peroxy-2-ethylhexanoate | 97.2 |
| Methyl Isobutyl Ketone | 151.9 |
| Feed 3 | |
| Butyl acrylate | 165.6 |
| Methyl Isobutyl Ketone | 10.0 |
| Feed 4 | |
| t-Amyl Peroxy-2-ethylhexanoate | 15.6 |
| Methyl Isobutyl Ketone | 120.0 |

-continued

| Ingredients | Parts By Weight (grams) |
|---|---|
| Feed 5 | |
| Mono butyl ether of propylene glycol | 359.4 |
| Dimethyl ethanol amine | 48.6 |

Charge 1 was added to a four-necked round bottom flask fitted with a thermocouple, mechanical stirrer, and condenser and heated to reflux. At this temperature, Feed 1 was added over 180 minutes. Fifteen minutes after the start of Feed 1, Feed 2 was added over 210 minutes. After a hold of 45 minutes, Feed 4 was added over 120 minutes. Fifteen minutes later, Feed 3 was added over 90 minutes. Then, the mixture was held for one hour, and Feed 5 was added while cooling the mixture to ambient temperature.

The final product was 70% solids by weight (as measured at 110° C. for one hour). The theoretical $T_g$ (glass transition temperature) of this polymer was −62° C.

Example 14

Four (4) metallic basecoat compositions were prepared from the following mixture of ingredients:

| | Parts by weight of Component | | | |
|---|---|---|---|---|
| Components | Example 1 (Comparative) | Example 2 | Example 3 (Comparative) | Example 4 |
| Polyurethane-acrylic latex w/9% DAAM/ADH[1] | 268.02 | 254.62 | 257.30 | 243.90 |
| Carbodilite V-02-L2[2] | — | — | 10.00 | 10.00 |
| LMA resin[3] | — | 7.41 | — | 7.41 |
| Byk 348 surfactant[4] | 0.23 | 0.23 | 0.23 | 0.23 |
| Odorless Mineral Spirits[5] | 7.50 | 7.50 | 7.50 | 7.50 |
| 2-Ethylhexanol[6] | 7.50 | 7.50 | 7.50 | 7.50 |
| Deionized Water | 218.02 | 201.02 | 244.42 | 199.62 |
| Laponite RD[7] | 1.81 | 1.81 | 1.81 | 1.81 |
| Butyl Carbitol[8] | 10.00 | 10.00 | 10.00 | 10.00 |
| Aluminum Paste[9] | 31.43 | 31.43 | 31.43 | 31.43 |
| Hexyl Cellosolve[10] | 3.00 | 3.00 | 3.00 | 3.00 |
| Aluminum Passivator | 10.11 | 10.11 | 10.11 | 10.11 |
| 50% DMEA[11] | 0.58 | 0.30 | 0.51 | 0.35 |
| Total | 558.20 | 534.93 | 583.81 | 532.86 |

[1]Example B, adipic dihydrazide (ADH) 1.2 g/100 g latex.
[2]Polycarbodiimide crosslinker commercially available from Nisshinbo.
[3]Example C.
[4]Additive commercially available from BYK Chemie.
[5]Solvent commercially available from Shell Chemical Co.
[6]Solvent commercially available from Dow Chemical Co.
[7]Sodium lithium magnesium silicate available from Southern Clay Products.
[8]Solvent commercially available from Dow Chemical Co.
[9]TSB 2180A aluminum paste available from Toyal America.
[10]Solvent commercially available from Dow Chemical Co.
[11]Dimethyl ethanolamine 50% aqueous solution.

Each basecoat was spray applied in an environment controlled to 70-75° F. (21-24° C.) and 50-60% relative humidity onto 4 inch by 12 steel panels that were coated with PPG Electrocoat (ED 6465) commercially available from PPG Industries, Inc. The substrate panels were obtained from ACT Test Panels, LLC of Hillsdale, Mich. The basecoats were applied in two coats, without a flash between coats, and then flashed at ambient temperature for 5 minutes and then dehydrated for 5 minutes at 80° C. The film thickness was approximately 0.55 mils (14 microns). 2K CeramiClear Low Bake Repair clearcoat available from PPG Industries, Inc. was modified with 25% NCO equivalents of Desmodur Z-4470 BA then applied over the basecoated panels in two coats without a flash between coats (color plus clear coating). The clearcoated panels were allowed to flash for 10 minutes at ambient conditions and baked for 30 minutes at 80° C. or 140° C. The film thickness was approximately 1.75 mils (44 microns).

Chip resistance and humidity resistance as determined by the degree of blistering of the color plus clear coating were determined and are reported below.

Chip Resistance and Humidity Resistance[12] at 80° C. Cure

| Example | Erichsen Chip Resistance[13] | Blister Rating after Humidity[14] |
|---|---|---|
| 1 | 2.0-2.5 | Medium 4 |
| 2 | 2.0 | Medium 4 |
| 3 | 2.0 | Medium-Dense 4 |
| 4 | 1.5 | Medium 4 |

[12]Ten day humidity resistance test similar to ASTM D 1735-92 conducted in a Harshaw Equipment GS "Uni-Fog" corrosion test cabinet set at 100° F. (38° C.) and 100% relative humidity.
[13]Stone chip test instrument Erichsen 508. Two 500 grams of steel shot (angular 4-5 mm) at 2.0 bar compressed air; the lower the value, the better the chip resistance.
[14]ASTM D 714 Degree of Blistering of Paints. Size of the blisters evaluated on a scale of 2-10 with 2 being large blisters and 8 being small blisters; 10 being no blisters; frequency of blisters graded as Dense, Medium-Dense, Medium and Few.

| Example | Erichsen Chip Resistance | Blister Rating after Humidity |
|---|---|---|
| 1 | 1.5 | Medium 8 |
| 2 | 1.5 | Few 8 |
| 3 | 1.5 | Medium 8 |
| 4 | 1.5 | Few 8 |

Whereas particular embodiments of this invention have been described above for purposes of illustration, it will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

What is claimed is:

1. An aqueous thermosetting coating composition comprising:
   (i) a continuous phase comprising water, and
   (ii) a dispersed phase comprising:
      (A) polymeric particles prepared from the polymerization of a mixture of ethylenically unsaturated compounds including ethylenically unsaturated monomers comprising from:
         (1) 2 to 30 percent by weight of a multi-ethylenically unsaturated monomer and
         (2) at least 30 percent by weight of an aldo or keto group-containing ethylenically unsaturated monomer, the percentages by weight being based on total weight of the ethylenically unsaturated monomers;
      (B) a polymer prepared from polymerizing the following mixture of ethylenically unsaturated monomers:
         (I) a $C_8$ to $C_{20}$ alkyl ester of (meth)acrylic acid;
         (II) a polymerizable ethylenically unsaturated monomer comprising a polar functional group; and
         (III) optionally, a polymerizable ethylenically unsaturated monomer, wherein (I), (II) and (III) are different from each other; and wherein the polymer has a glass transition temperature of −10° C. or less;
(C) a polyhydrazide; and
(D) one or more pigments.

2. The composition of claim 1 in which the mixture of ethylenically unsaturated compounds includes an ethylenically unsaturated polyurethane.

3. The composition of claim 2 in which the ethylenically unsaturated polyurethane is prepared from reacting an organic polyisocyanate with a polyol containing carboxylic acid functionality and a hydroxyalkyl (meth)acrylate such that the ethylenically unsaturated polyurethane is free of isocyanate groups.

4. The composition of claim 3 in which the ethylenically unsaturated polyurethane comprises from 30 to 60 percent by weight of the mixture of ethylenically unsaturated compounds and the ethylenically unsaturated monomers in (A) comprise from 40 to 70 percent by weight of the mixture of ethylenically unsaturated compounds; the percentages by weight being based on total weight of the ethylenically unsaturated compounds.

5. The composition of claim 1 in which the ethylenically unsaturated monomers in (A) comprise from 4 to 30 percent by weight of an alkyl ester of (meth)acrylic acid having at least 6 carbon atoms in the alkyl group; the percentages by weight being based on total weight of the ethylenically unsaturated monomers.

6. The composition of claim 1 in which the polyhydrazide is a bishydrazide of a dicarboxylic acid containing from 2 to 16 carbon atoms.

7. The composition of claim 1 in which a film of the polymeric particles has a $T_g$ less than 25° C.

8. The composition of claim 1 in which the mixture of ethylenically unsaturated compounds contains at least one compound containing carboxylic acid groups that are at least partially neutralized with an amine.

9. The composition of claim 8 in which the amine is a volatile amine.

10. The composition of claim 1 which additionally contains (E) a polycarbodiimide.

11. The composition of claim 1 wherein the $C_8$ to $C_{20}$ alkyl ester of (meth)acrylic acid (I) comprises octyl (meth)acrylate, lauryl (meth)acrylate, cetyl (meth)acrylate, stearyl (meth)acrylate, behenyl (meth)acrylate, and/or eicosyl (meth)acrylate.

12. The composition of claim 11 wherein the $C_8$ to $C_{20}$ alkyl ester of (meth)acrylic acid (I) is present at an amount of at least 50 weight percent and not more than 95 weight percent based on total weight of monomer solids present in polymer (B).

13. The composition of claim 11 wherein the $C_8$ to $C_{20}$ alkyl ester of (meth)acrylic acid (I) comprises lauryl (meth)acrylate.

14. The composition of claim 1 wherein the polar functional group of the ethylenically unsaturated monomer (II) comprises carboxyl groups, hydroxyl groups, and/or amine groups.

15. The composition of claim 14 wherein the polar functional group of the ethylenically unsaturated monomer (II) comprises a carboxyl group.

16. The composition of claim 1 wherein the ethylenically unsaturated monomer (II) comprises (meth)acrylic acid.

17. The composition of claim 1 wherein the ethylenically unsaturated monomer (II) is present at an amount of at least 0.1 weight percent and not more than 5 weight percent based on total weight of monomer solids present in polymer (B).

18. The composition of claim 1 wherein the polymer (B) has a glass transition temperature of −30° C. or less.

19. The composition of claim 1 wherein the polymer (B) is present in the dispersed phase at an amount of at least 2 weight percent and not more than 30 weight percent resin solids based on the total weight of resin solids of the dispersed phase.

* * * * *